United States Patent
Mortland

(10) Patent No.: US 11,338,905 B2
(45) Date of Patent: May 24, 2022

(54) OFFSET DRIVE ARM ACTUATION OF INBOARD FLAPS

(71) Applicant: The Boeing Company, Chicago, IL (US)

(72) Inventor: Michael T. Mortland, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 261 days.

(21) Appl. No.: 16/679,950

(22) Filed: Nov. 11, 2019

(65) Prior Publication Data

US 2021/0139129 A1    May 13, 2021

(51) Int. Cl.
*B64C 9/02* (2006.01)
*B64C 9/18* (2006.01)

(52) U.S. Cl.
CPC . *B64C 9/02* (2013.01); *B64C 9/18* (2013.01)

(58) Field of Classification Search
CPC .... B64C 9/02; B64C 9/04; B64C 9/06; B64C 9/16; B64C 9/18
See application file for complete search history.

(56) References Cited

U.S. PATENT DOCUMENTS

| | | | |
|---|---|---|---|
| 5,836,550 A * | 11/1998 | Paez | B64C 9/22 244/214 |
| 9,296,464 B1 * | 3/2016 | Tuohimaa | B64C 7/00 |
| 10,759,516 B2 | 9/2020 | Kordel et al. | |
| 2009/0026317 A1 * | 1/2009 | Coughlin | B64C 9/16 244/129.1 |
| 2009/0218446 A1 * | 9/2009 | McAlinden | B64C 9/02 244/131 |
| 2012/0012696 A1 * | 1/2012 | Sakurai | B64C 9/16 244/99.3 |
| 2016/0059952 A1 * | 3/2016 | Bleazard | B64C 7/00 244/215 |
| 2018/0141636 A1 * | 5/2018 | Currie | B64C 9/02 |
| 2019/0112027 A1 * | 4/2019 | Ahern | B64C 9/16 |
| 2020/0031453 A1 * | 1/2020 | Tsai | B64C 9/02 |

* cited by examiner

*Primary Examiner* — Richard R. Green
*Assistant Examiner* — Arfan Y. Sinaki
(74) *Attorney, Agent, or Firm* — Hanley, Flight & Zimmerman, LLC

(57) ABSTRACT

Offset drive arm actuation of inboard flaps is disclosed. A disclosed example apparatus includes an inboard flap support for moving an inboard flap. The inboard flap support includes an offset drive arm extending between a first attachment point of the inboard flap and a first pivot of a support, and a linkage extending between a second attachment point of the inboard flap positioned at a different position from the first attachment point and a second pivot of the support.

20 Claims, 12 Drawing Sheets

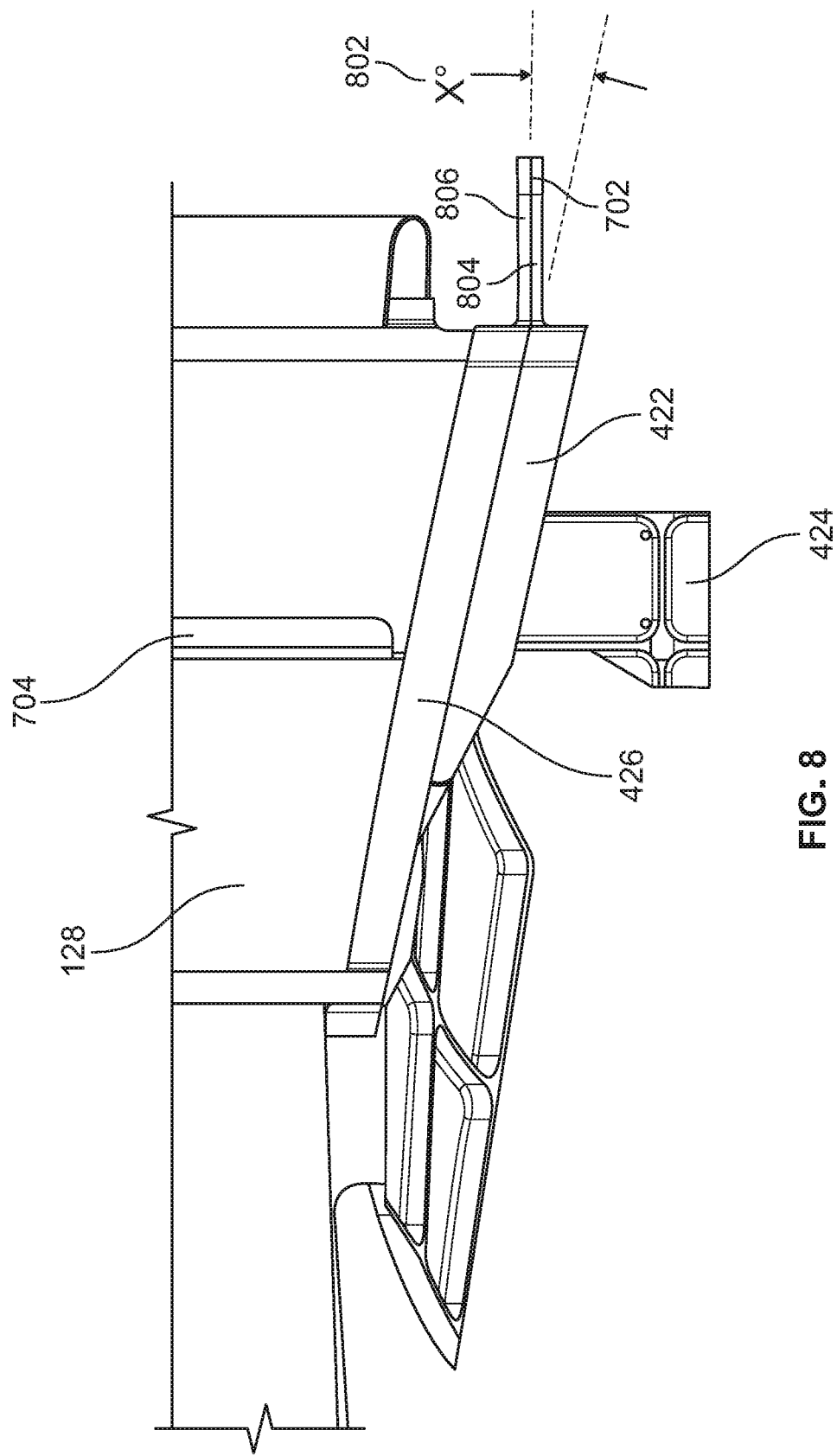

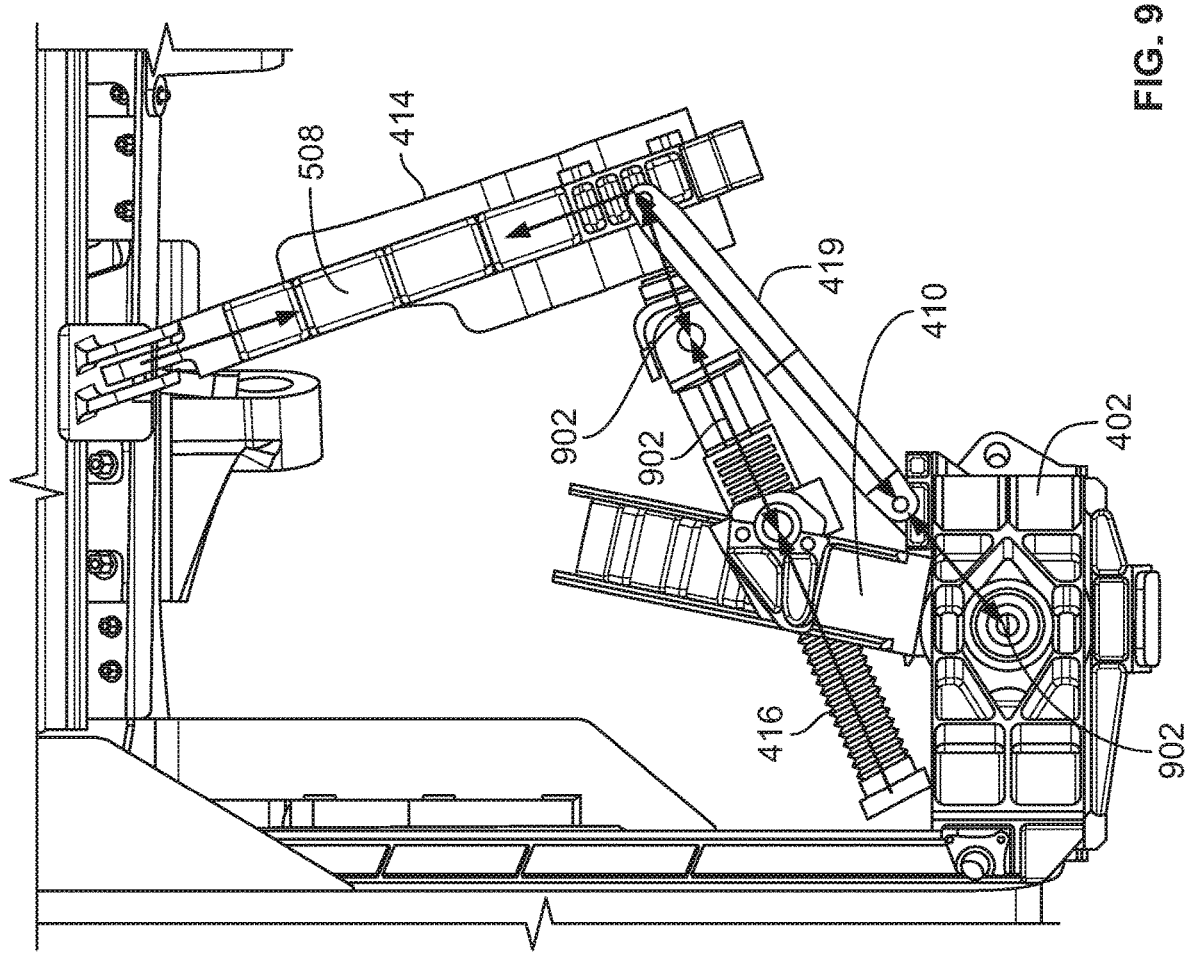

OFFSET DRIVE ARM ACTUATION OF INBOARD FLAPS

FIELD OF THE DISCLOSURE

This disclosure relates generally to aircraft, and, more particularly, to offset drive arm actuation of inboard flaps.

BACKGROUND

An inboard end of an inboard flap is typically driven by actuation systems within a wing-to-body fairing. The inboard flap typically includes structural members that pass through the wing-to-body fairing to interface with a drive system. In particular, a torque tube, which is operationally coupled to the inboard flap via multiple ribs, is driven by an actuator disposed within the wing-to-body fairing to cause movement of the inboard flap. Particularly, the torque tube is translated and/or rotated by the actuator to cause rotational and fowler motions of the inboard flap.

SUMMARY

An example apparatus includes an inboard flap support for moving an inboard flap. The inboard flap support includes an offset drive arm extending between a first attachment point of the inboard flap and a first pivot of a support, and a linkage extending between a second attachment point of the inboard flap positioned at a different position from the first attachment point and a second pivot of the support.

An inboard flap for use with an aircraft includes a support rib extending between fore and aft sides of the inboard flap, a first attachment point to be operatively coupled to an offset drive arm at a first position of the inboard flap, where the offset drive arm is to be operationally coupled to a first pivot of a support, and a second attachment point to be operatively coupled to a linkage at a second position of the inboard flap, where the second position is different from the first position, and where the linkage is to be operationally coupled to a second pivot of the support.

An example method includes coupling an offset drive arm to a first attachment point of an inboard flap, where the offset drive arm is to extend between the first attachment point and a first pivot of a support, and coupling a linkage to a second attachment point of the inboard flap, where the linkage is to extend between the second attachment point and a second pivot of the support, and where the second attachment point is located at a different position from the first attachment point.

BRIEF DESCRIPTION OF THE DRAWINGS

FIG. 8. is a top view depicting a canted flap rib orientation that can be implemented in examples disclosed herein.

FIG. 9. depicts a load path that can result from examples disclosed herein.

Figure 1:
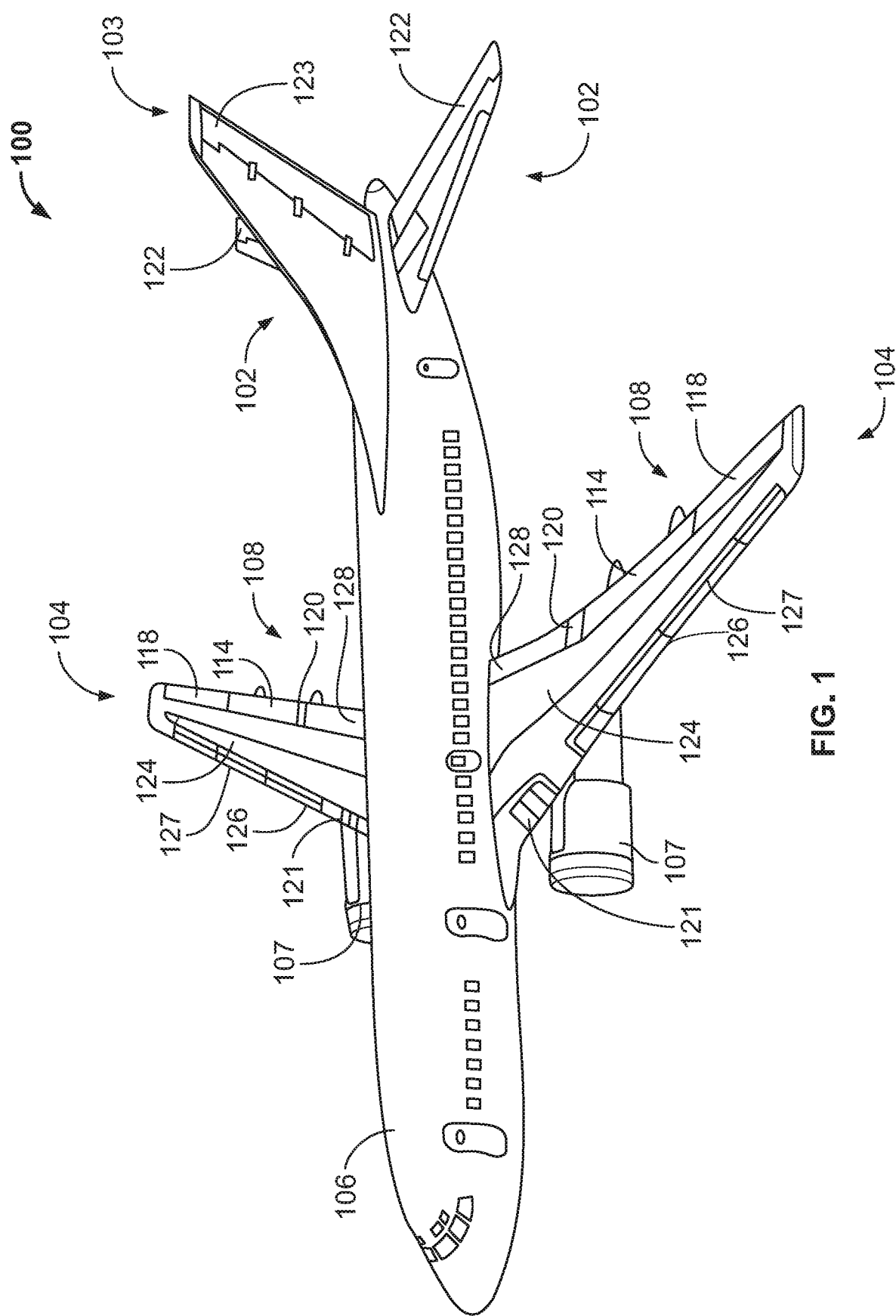
FIG. 1 is an aircraft in which examples disclosed herein may be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Offset drive arm actuation of inboard flaps is disclosed. Some known inboard flap actuation systems employ a torque tube that is driven by an actuator disposed within the wing-to-body fairing. In particular, the torque tube is operationally coupled to multiple ribs of an inboard flap and, during operation of the inboard flap, the actuator moves the torque tube to displace the inboard flap. However, implementation of the torque tube can necessitate redundant structures and/or strengthening components to ensure sufficient strength. Further, these redundant structures and/or strengthening components can increase costs and/or weight of an aircraft.

Examples disclosed herein enable increased fowler motion of inboard flaps, thereby enabling greater aerodynamic control of an aircraft. Examples disclosed herein enable an inboard flap to be operated with relatively strong, light-weight and cost-effective components. Further, examples disclosed herein can improve aerodynamic properties by implementing an inclined or canted closeout surface of the inboard flap and/or a closeout door associated with the inboard flap to decrease component gaps and, thus, reduce overall drag of the aircraft, for example.

Examples disclosed herein implement an inboard flap support with an offset drive arm to move an inboard flap. The offset drive arm is operatively coupled to a first attachment point of the inboard flap and a first pivot (e.g., a driving pivot) of a support (e.g., a support frame). Further, the example inboard flap support also includes a linkage rotationally coupled to a second attachment point of the inboard flap and a second pivot (e.g., a crank pivot) of the support. The second attachment point is positioned at a different location of the inboard flap from the first attachment point. As a result, an increased movement range and/or fowler motion of the inboard flap is enabled. Further, support structure redundancies are not necessitated, thereby allowing relatively cost-effective and light weight components to be used.

In some examples, a ball screw actuator causes the offset drive arm to rotate. In some examples, the offset drive arm includes a frame structure with a generally rectangular cross-sectional profile. In some examples, at least one surface associated with the inboard flap support is canted to enable smaller gaps between components and, thus, improved aerodynamic characteristics (e.g., reduced drag).

As used herein, the term "offset drive arm" refers to a device and/or assembly that transmits an input force from an actuator to cause motion in another component that is offset from the actuator. As used herein, the term "flap support" refers to a component, device and/or assembly that is used to position, support and move a corresponding flap.

FIG. 1 illustrates an example aircraft 100 in which examples disclosed herein can be implemented. In the illustrated example, the aircraft 100 includes horizontal tails 102, a vertical tail 103 and wings (e.g., fixed wings) 104 attached to a fuselage 106. The wings 104 of the illustrated example have engines 107, and control surfaces (e.g., flaps, ailerons, tabs, etc.) 108, some of which are located at a trailing edge or a leading edge of the wings 104. The control surfaces 108 may be displaced or adjusted (e.g., deflected, etc.) to provide enhanced lift during takeoff, landing and/or flight maneuvers. In some examples, the control surfaces 108 are operated (i.e., displaced) independently of one another. The example control surfaces 108 include outboard flaps (e.g., rotatable flaps) 114, ailerons 118, flaperons 120, leading edge Krueger flaps 121, leading edge slats 127 and inboard flaps 128. In this example, the horizontal tails 102 include elevators 122 and the vertical tail 103 includes a rudder 123. The wings 104 also define upper and lower surfaces (e.g., upper and lower sides, upper and lower aerodynamic surfaces, etc.) 124, 126, respectively.

To control flight of the aircraft 100, the control surfaces 108 mounted to the wings 104 alter the lift and pitch of the aircraft 100. Accordingly, the control surfaces 108 of the illustrated example can transmit loads to and throughout the fuselage 106 as they are moved to direct movement of the aircraft 100. The inboard end of the inboard flaps 128 are actuated from an actuator in the wing-to-body fairing to direct movement and/or alter aerodynamic characteristics of the aircraft 100.

Figure 2A:
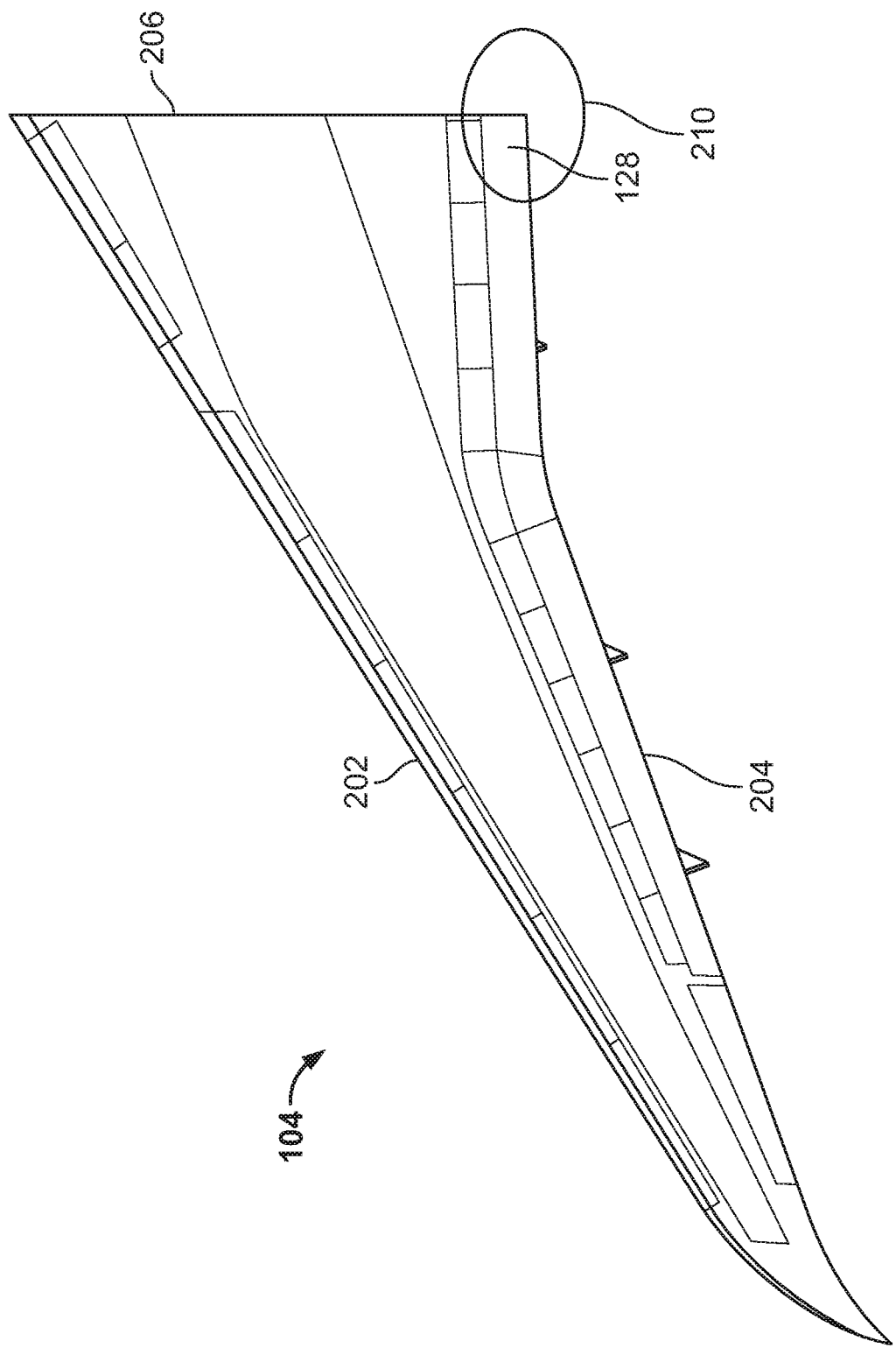
FIG. 2A is top view of a wing of the aircraft of FIG. 1.

FIG. 2A is top view of the wing 104 of the aircraft 100 of FIG. 1. In particular, examples disclosed herein can be implemented on the wing 104. As can be seen in FIG. 2A, the wing 104 includes the aforementioned inboard flap 128, a leading edge 202, a trailing edge 204, and a side of body (SOB) coupling interface 206. In particular, the inboard flap 128 is positioned at a region 210 proximate the coupling interface 206 at which the wing 104 is coupled to the fuselage 106 (shown in FIG. 1).

Figure 2B:
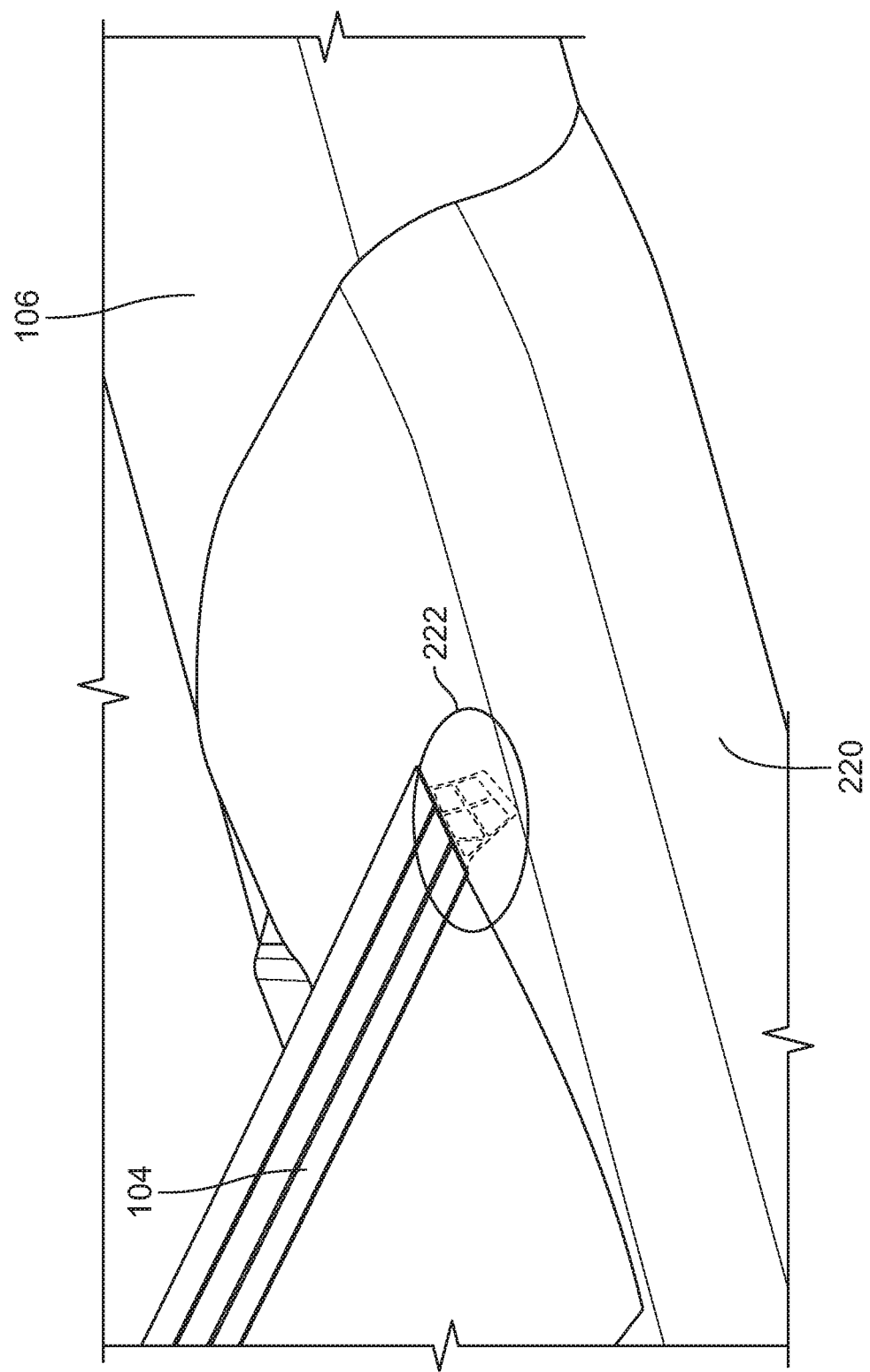
FIG. 2B illustrates example positioning of examples disclosed herein.

FIG. 2B illustrates example positioning of examples disclosed herein. In the illustrated example of FIG. 2B, a wing-to-body fairing 220 is shown at a geometric transition between the fuselage 106 and the wing 104. Examples disclosed herein can be implemented within the wing-to-body fairing 220 in a region 222, which is generally denoted in FIG. 2B. Additionally or alternatively, examples disclosed herein are at least partially disposed within the fuselage 106.

Figure 3:
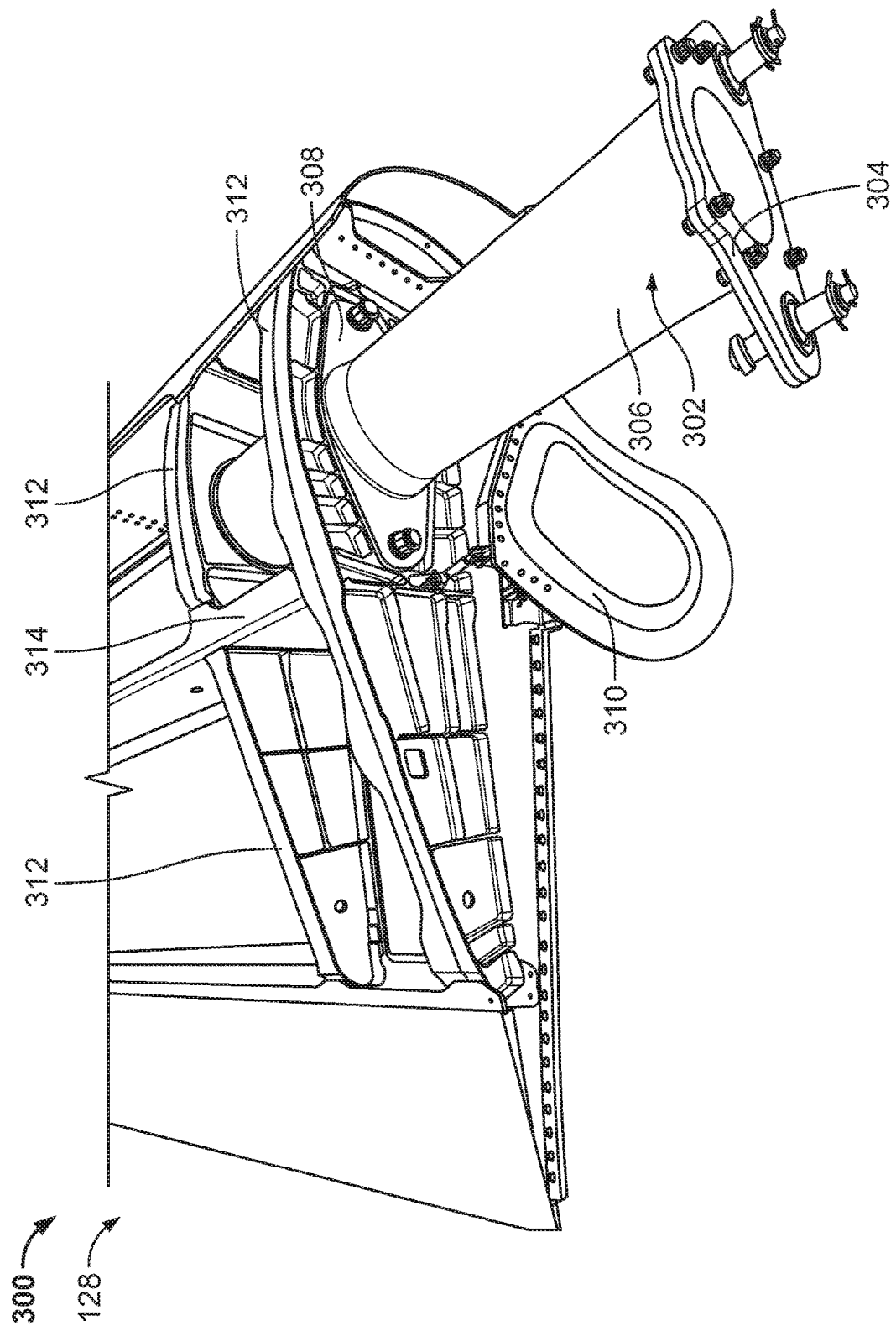
FIG. 3 is a perspective cutaway view of a known inboard flap assembly.

FIG. 3 is a perspective cutaway view of a known inboard flap assembly 300. The known inboard flap assembly 300 includes a torque tube assembly 302, which includes an actuator interface flange 304, a tube 306, and a flap rib interface flange 308. Further, the known inboard flap assembly 300 also includes a contoured closeout door 310, flap ribs 312, and a flap spar 314.

In operation, an actuator (not shown) moves the torque tube 302 and, thus, the ribs 312 to cause movement of the inboard flap 128. As a result, the inboard flap 128 is rotated and also translated between aft and fore directions of the aircraft 100 in a fowler motion. In turn, the contoured closeout door 310 is caused to move along with the motion of the inboard flap 128. However, based on the geometric arrangement of the known inboard flap assembly 300, a degree of the fowler motion (i.e., motion between fore and aft directions of the aircraft 100) is relatively limited. Further, the tube 306 and the ribs 312 are built with redundant structures (e.g., multiple concentric tubes, redundant ribs coupled to one another) to mitigate any potential effects of a component malfunction. However, these redundant structures can be costly and difficult to manufacture and/or assemble.

Figure 4:
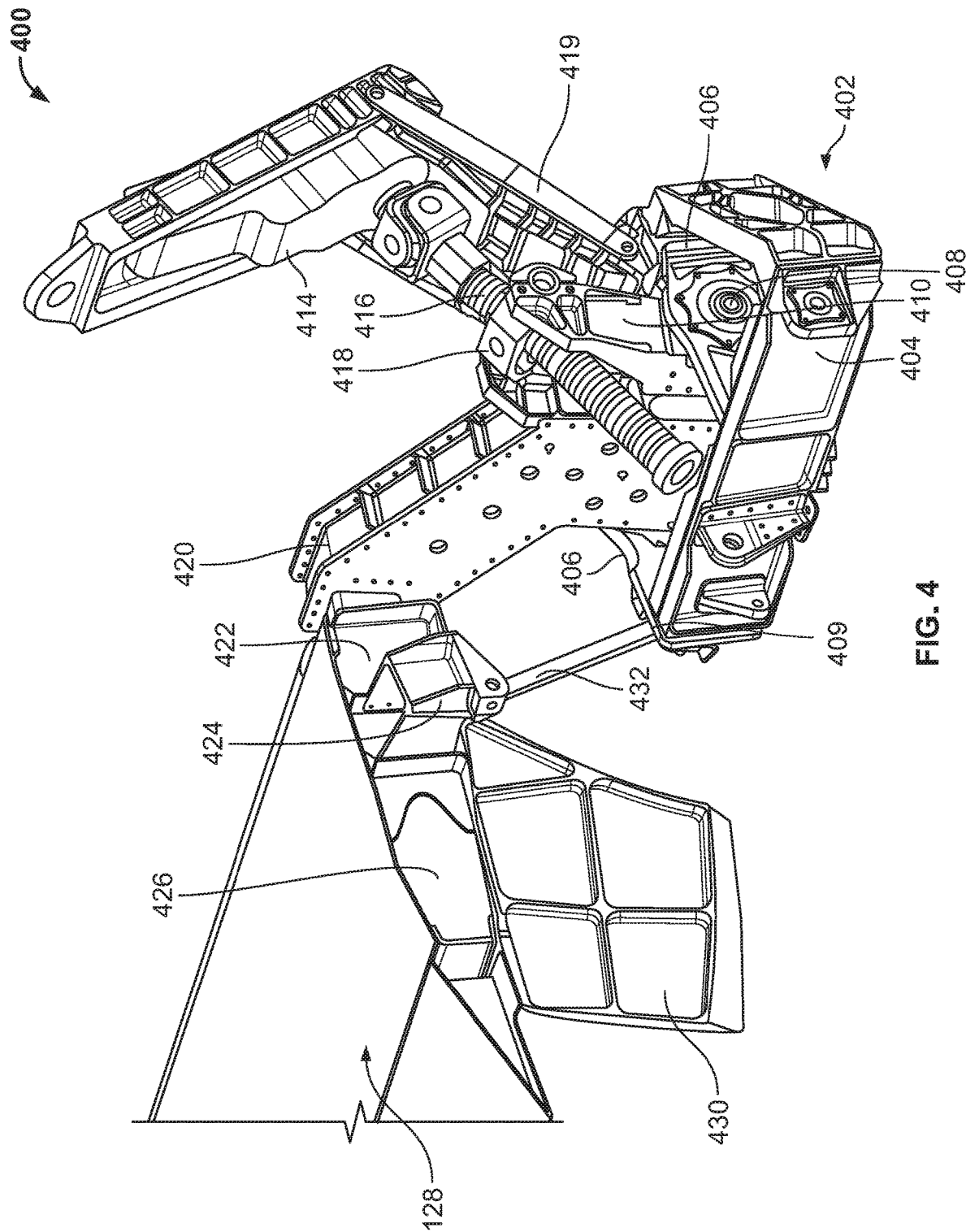
FIG. 4 is a perspective view of an example inboard flap support in accordance with teachings of this disclosure.

FIG. 4 is a perspective view of an example inboard flap support (e.g., an offset drive arm actuation system, an inboard flap driver, etc.) 400 in accordance with teachings of this disclosure. The inboard flap support 400 of the illustrated example includes a support 402, which includes a frame (e.g., a walled frame, a walled structure, a mounting frame, etc.) 404, hinge ribs 406 that defines a pivot 408, a pivot 409, and a swing arm 410, which rotates about the pivot 408. The example inboard flap support 400 also includes an actuator 414 with a rotatable rod 416 and a threaded collar 418. In this example, the actuator 414 is implemented as a ball screw actuator. The inboard flap support 400 further includes a support member 419, an offset drive arm (e.g., an enclosed arm, a frame structured arm, a driving arm, etc.) 420, which is integrated with and/or assembled to the swing arm 410, a drive rib (e.g., a closeout rib, a side support rib, etc.) 422, a pivot mount bracket 424, a support rib (e.g., a flap end rib, etc.) 426, a closeout door or surface (e.g., a contoured closeout door or surface, etc.) 430, and a linkage (e.g., a pivoting linkage, a pivoting member, a rotational coupler, etc.) 432.

To define a movement range of the inboard flap 128, the support rib 426, which extends between aft and fore sides of the inboard flap 128, is rigidly coupled to the drive rib 422 and, thus, the pivot mount bracket 424. In turn, the linkage 432 is rotationally coupled to the pivot mount bracket 424 at a first distal end and the support 402 at a second distal end. In other words, the linkage 432 can pivot at both of its respective first and second distal ends. In the illustrated example, the offset drive arm 420 can pivot relative to the inboard flap 128.

To move the inboard flap 128 between stowed and deployed positions, the rotatable rod 416 of the actuator 414 is rotated, thereby displacing the threaded collar 418 and causing rotation of the swing arm 410 along with the offset drive arm 420. As a result, motion of the support rib 426, which is coupled to the drive rib 422 and the pivot mount bracket 424, causes significant translational and rotational movement of the inboard flap 128 and the closeout door 430. In this example, the resultant rotation of the linkage 432 further at least partially defines a motion of the inboard flap 128. Particularly, the rotation of the linkage 432 and the offset drive arm 420 in combination with a relative spatial arrangement of the linkage 432, the offset drive arm 420 and the inboard flap 128, enables a relatively large degree of motion of the inboard flap 128 along the fore and aft directions of the aircraft 100 (i.e., a fowler motion of the inboard flap 128), as well as rotational displacement. Additionally or alternatively, the drive arm 420, the linkage 432, the support 402 and the inboard flap 128 define a four-bar linkage and/or kinematic motion mechanism.

To structurally reinforce the inboard flap 128, the support rib 426 extends between an aft end to a fore end of the inboard flap 128 (e.g., extends along a partial or entire length of the inboard flap 128). Further, the support rib 426 is coupled to the drive rib 422 (e.g., coupled along an entire length of the drive rib 422) which, in turn, is coupled to the pivot mount bracket 424. The pivot mount bracket 424 includes a box-like structure to maintain structural integrity as the inboard flap 128 is moved. Further, the offset drive arm 420 exhibits a box-like frame structure (e.g., a frame structure with at least one generally rectangular cross-sectional profile) to support the inboard flap 128 and to transmit driving loads translated between the actuator 414 and the inboard flap 128. In some examples, both the support rib 426 and the drive rib 422 are coupled (e.g., rigidly coupled, rotationally coupled) to the drive arm 420. Additionally or alternatively, the pivot mount bracket 424 exhibits at least one flanged surface, flanged end and/or wall to contact the drive rib 422 and/or the support rib 426.

While the actuator 414 is implemented as a ball screw actuator in this example, any appropriate type of movement and/or actuation device can be implemented instead including, but not limited to, a hydraulic cylinder, a motor, a driven magnet and/or a servo, etc. In some other examples, multiple ones of the linkage 432 are implemented. In other words, any appropriate kinematic mechanism can be employed instead.

Figure 5:
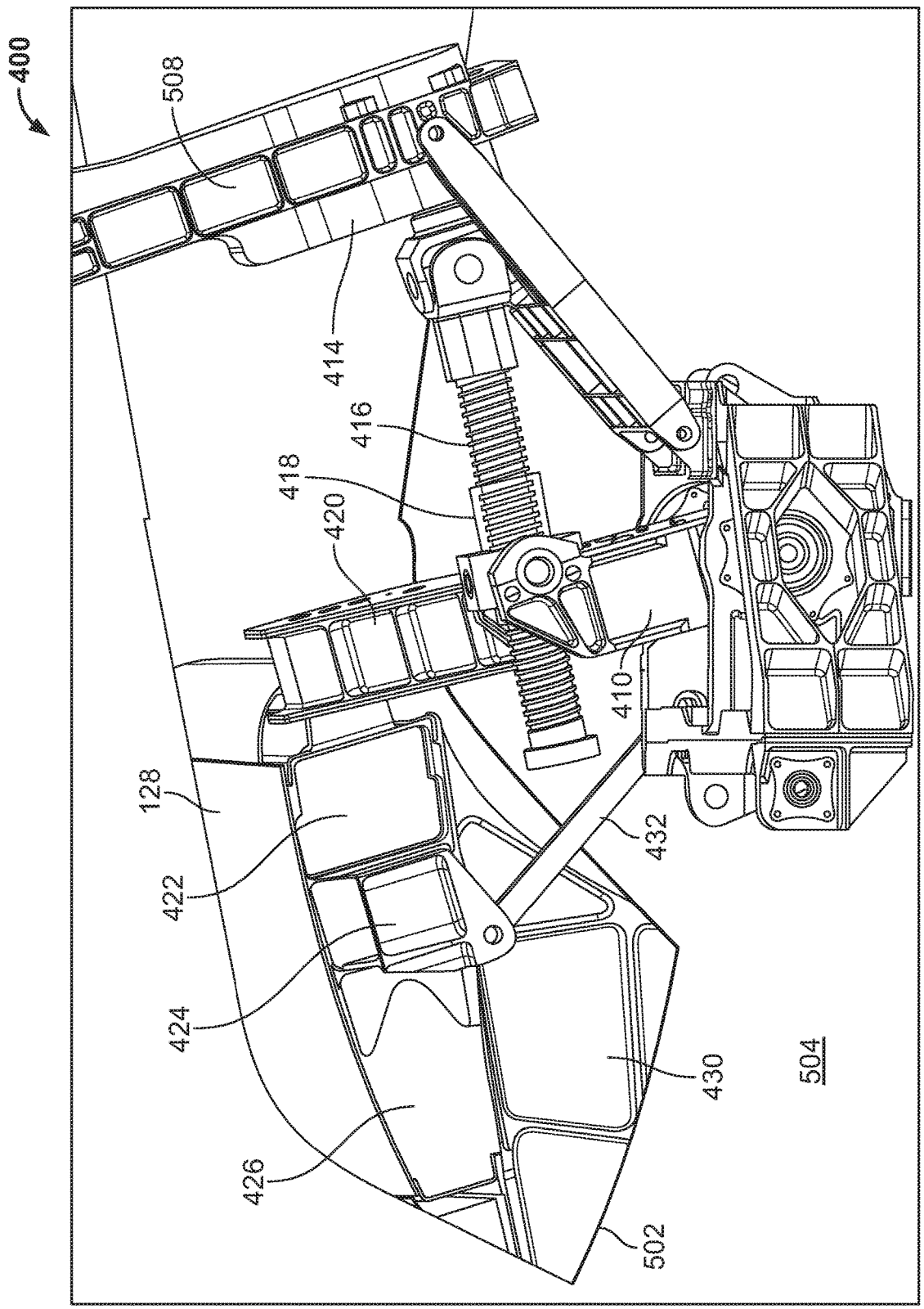
FIG. 5 is a side view of the example inboard flap support of FIG. 4.

FIG. 5 is a side view of the example inboard flap support 400 of FIG. 4. In the illustrated example, the contoured closeout door 430 is shown relative to an opening or cutout 502 of a wing-to-body fairing surface (e.g., an outer fairing surface and/or panel) 504. As can be seen in FIG. 5, a change of position of the threaded collar 418 along with the rotatable rod 416, which is driven by the actuator 414 that is coupled to a support 508 at an end opposite the swing arm 410, causes a rotational movement of the swing arm 410 along with the offset drive arm 420. As a result of the movement of the offset drive arm 420 and the inboard flap 128, the support rib 426, the drive rib 422, the pivot mount bracket 424 and the linkage 432 are caused to move. In this example, the opening 502 and the closeout door 430 are appropriately sized and/or shaped to account for a relatively large degree of movement enabled by examples disclosed herein.

Figure 6A:
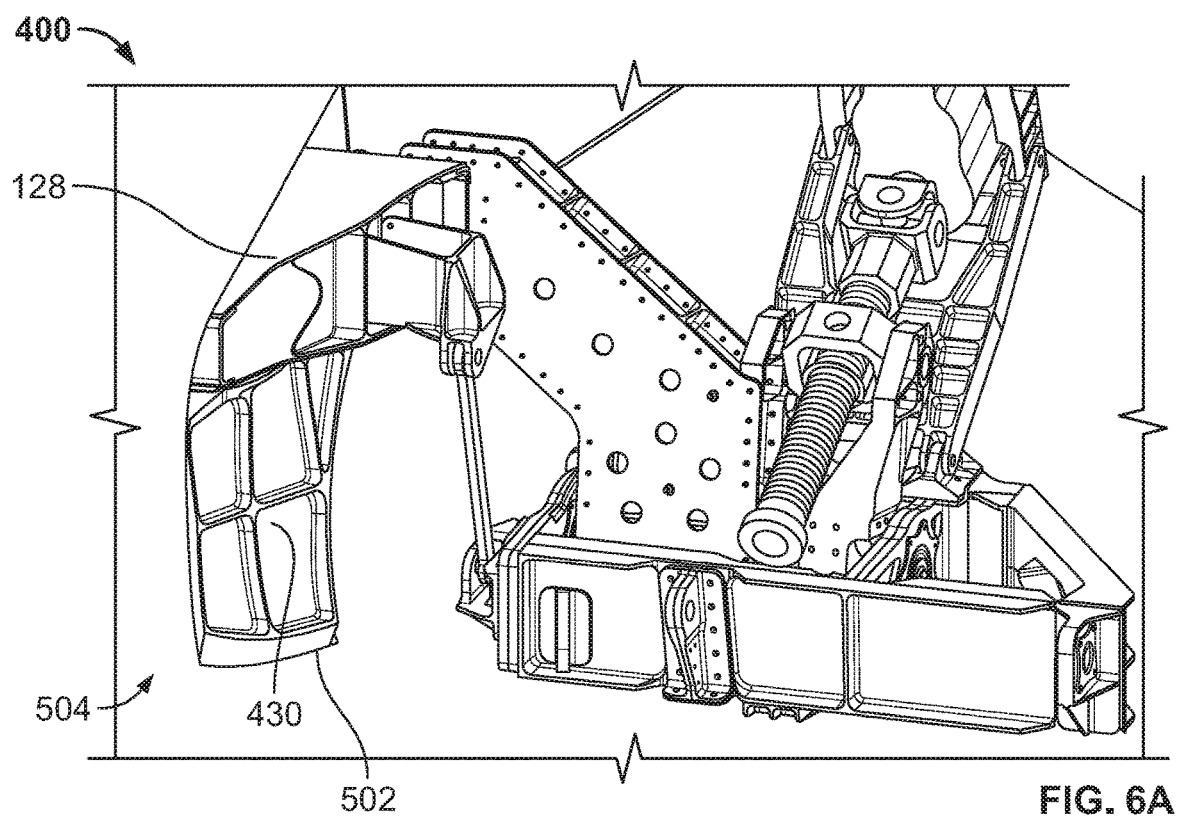
FIGS. 6A and 6B represent different angular positions of the example inboard flap support of FIGS. 4 and 5.
Figure 6B:
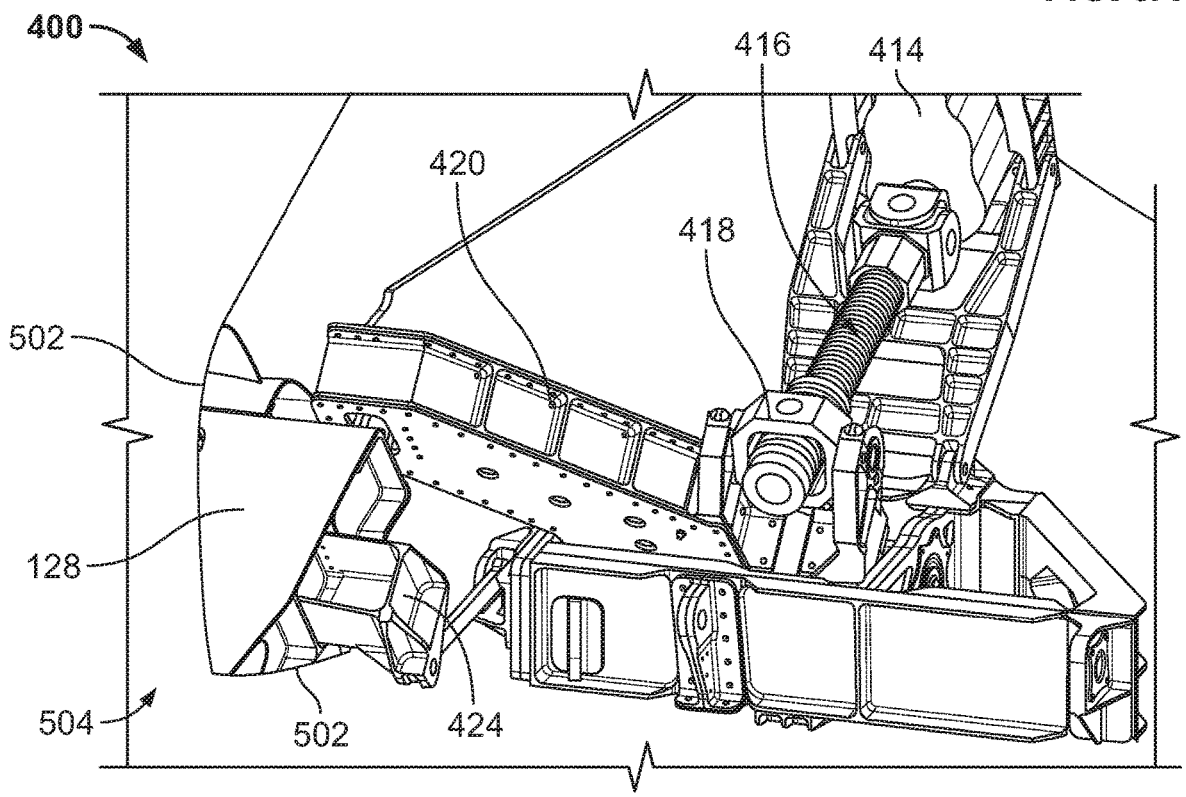

FIGS. 6A and 6B represent different angular positions of the example flap support 400 of FIGS. 4 and 5. FIG. 6A depicts the inboard flap 128 in a fully retracted position (e.g., a stowed position). In the illustrated example, a shape of the closeout door 430 generally matches and/or follows an outline associated with the opening 502 of the wing-to-body fairing surface 504. In other words, at least a portion of the closeout door 430 is complementarily shaped to the opening 502. In some examples, at least a portion of the closeout door 430 contacts, seals (e.g., via a compressible gasket) and/or rests against the opening 502.

Turning to FIG. 6B, the actuator 414 is depicted at a fully extended position in which the threaded collar 418, the rotatable rod 416 and the offset drive arm 420 move the inboard flap 128 to a deployed position. As can be seen in the illustrated example of FIG. 6B, the opening 502 enables the pivot mount bracket 424 to move at least partially within the wing-to-body fairing 504. Further, the general hook-like shape of the pivot mount bracket 424 facilitates prevention of the pivot mount bracket 424 from impacting and/or contacting the wing-to-body fairing 504.

Figure 7A:
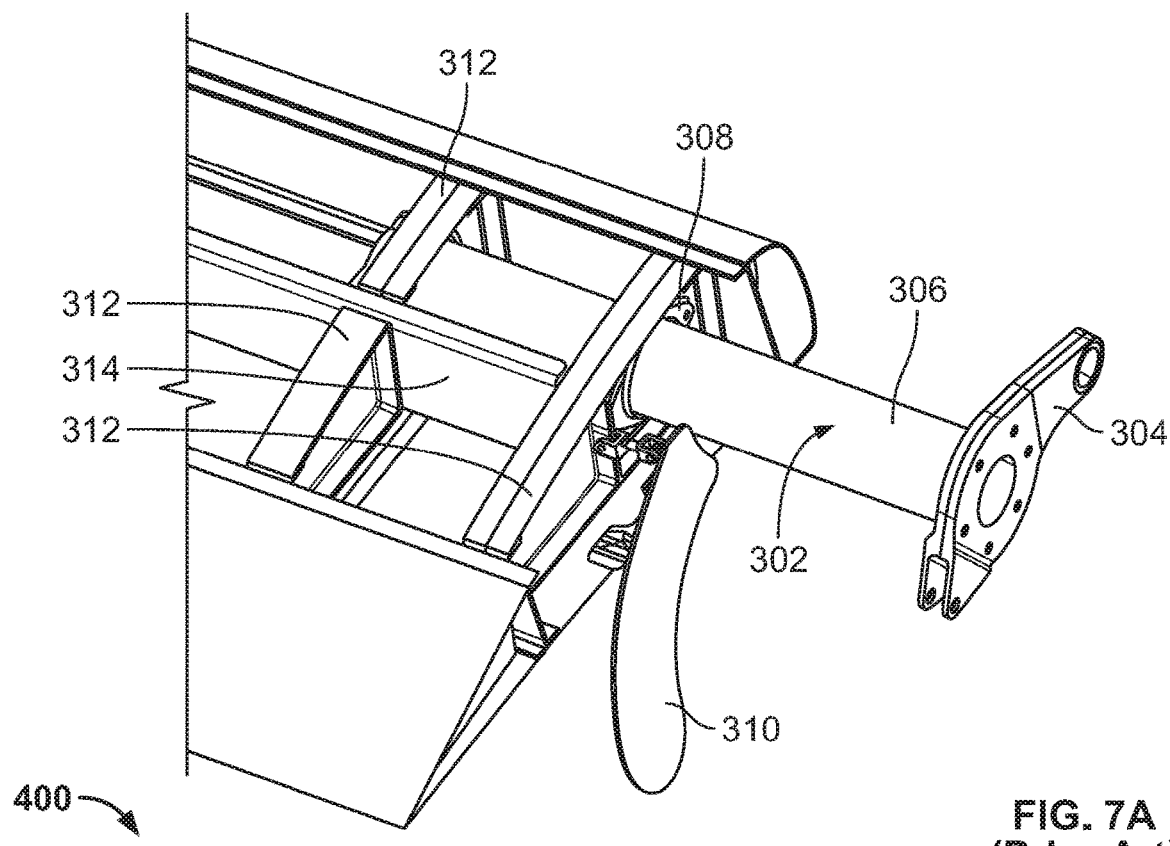
FIGS. 7A and 7B depict perspective cutaway views of a known inboard flap assembly and the example inboard flap assembly of FIGS. 4-6B, respectively.
Figure 7B:
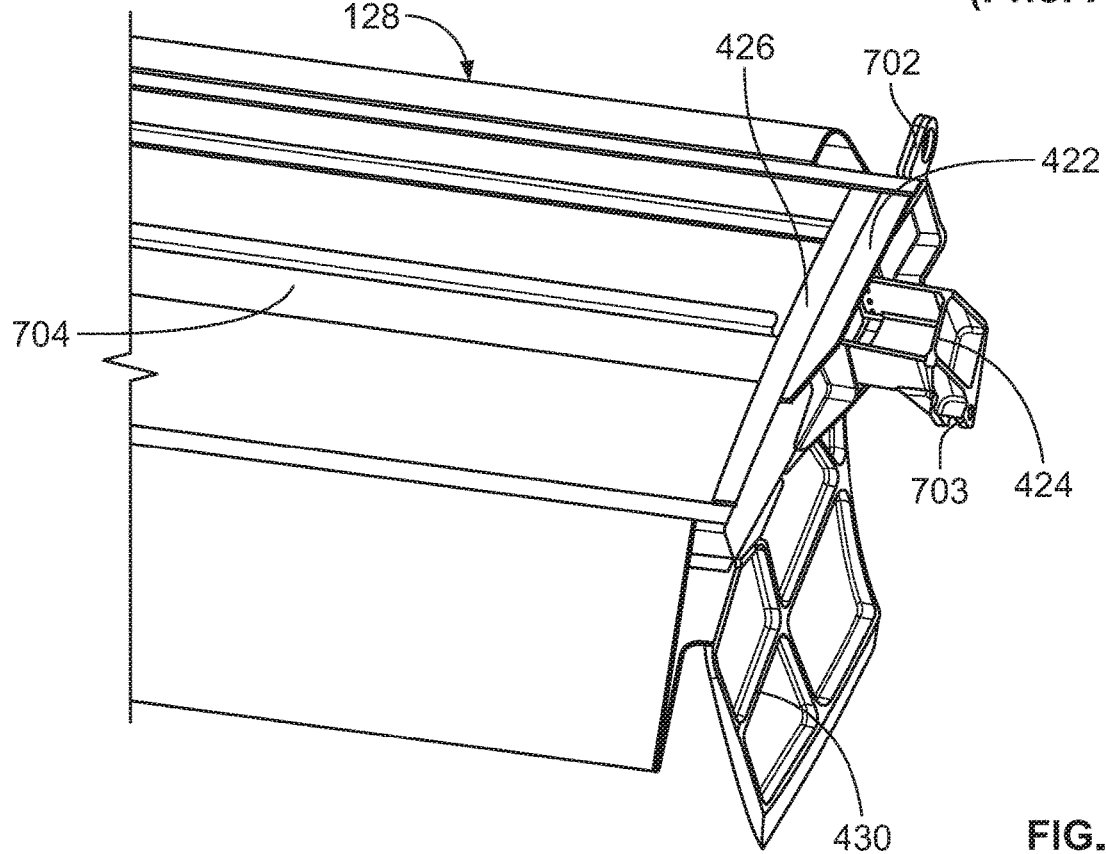

FIGS. 7A and 7B depict perspective cutaway views of a known inboard flap assembly and an inboard flap assembly associated with the example flap support 400 of FIGS. 4-6B, respectively. In the known implementation of FIG. 7A, the torque tube 302 is shown extending through and coupled to the ribs 312. Further, the spar 314 is shown extending between the ribs 312. In this known implementation, structural redundancies (e.g., multiple concentric tubes, multiple ribs joined together, etc.) are necessitated to alleviate potential stress concentrations resulting from torsional loads. Further, the general shape (i.e., a generally arc-shaped geometry) of the closeout door 310 indicates a limited range of motion of the known inboard flap support 300 based on movement of the flange 304, the tube 306 and the flange 308.

Turning to FIG. 7B, the example flap support 400 is shown. In contrast to the known flap support 300, motion of the inboard flap 128 is driven via a first attachment point (e.g., a mounting point, a pivot point, a pivot joint, a driving pivot, etc.) 702 moved by the offset drive arm 420 of FIG. 4. In particular, the offset drive arm 420 moves the inboard flap 128 and, thus, drives movement of the linkage 432 at a second attachment point (e.g., a pivot point, a crank pivot) 703, which is defined by the pivot mount bracket 424 in this example. Further, only one of the support ribs 426 is implemented in this example to be operatively coupled to the offset drive arm 420. As a result, a spar 704 is relatively continuous as it is extends toward the support rib 426. In some other examples, multiples ones of the spar 704 are implemented (e.g., extending parallel or angled relative to the spar 704 shown in FIG. 7B).

FIG. 8. is a top view depicting a canted flap rib orientation that can be implemented in examples disclosed herein. Particularly, examples disclosed herein enable an angled rib structure to be implemented so that aerodynamic gaps between the inboard flap 128 and the wing-to-body fairing 504 (not shown) can be reduced (e.g., minimized), thereby improving overall aerodynamic characteristics (e.g., reduced drag). In the illustrated example, the support rib 426 and the drive rib 422 are angled from a typical orientation (e.g. 90 degrees) to the flap spars 704 at approximately an angular range from 8 degrees to 16 degrees (e.g., 12 degrees), as generally indicated by an arrow 802 and the letter "X" while the pivot mount bracket 424 generally extends from the drive rib 422 at a neutral angle (e.g., zero degrees). In this example, the first attachment point 702, which is operationally coupled to the swing arm 420 of FIG. 4, is defined by rigidly coupled flanges or tabs 804, 806 of the drive rib 422 and the support rib 426, respectively.

In this example, canting of the drive rib 422 and the support rib 426 enables a forward end associated with the first attachment 702 shown in FIG. 8 to extend at least one flap structure within the wing-to-body fairing 504 (e.g., when the flap is stowed) and interface with the offset drive arm 420 that is disposed (e.g., completely disposed) within the wing-to-body fairing 504. While in the stowed position, an aft end of the rib 426 is nearly aligned to and/or tangent with the wing-to-body fairing 504. As a result, the contoured closeout door 430, which acts as a component of the wing-to-body fairing 504 and/or has a matching contoured geometry with the wing-to-body fairing 504, can be directly supported by the rib 426 and, additionally, can be relatively tangent to and/or flush with the fixed portion of the wing-to-body fairing 504 in an area or region proximate the cutout 502.

In the deployed position, the forward end associated with the first attachment point 702 is still substantially inside the wing-to-body fairing 504. However, an aft end opposite the forward end is external to the wing-to-body fairing 504 and extends downwardly outside of the cutout 502 (See FIG. 5). As a result, an overall size of the cutout 502 can be minimized because the cutout 502 does not have to accommodate a full motion relief opening.

In contrast, in known implementations having a torque tube flap extension structure, a cutout is usually sized large enough to accommodate a full range of flap motion. Therefore, known flaps implementing torque tubes typically have relatively restrained or reduced motion (i.e., less fowler travel) or employ relatively large cutouts in an associated wing-to body fairing and, therefore, can necessitate relatively large contoured closeout doors to fill the aforementioned cutout when the flaps are stowed.

FIG. 9 depicts a load path that can result from examples disclosed herein. In the illustrated example, arrows 902 depict load paths between the support 402, the swing arm 410, the actuator support member 419, the actuator 414, the rotatable rod 416 and the actuator support 508. As can be seen in the illustrated view of FIG. 9, the aforementioned load paths are not significantly angled from one another and, thus, loading moments or torques are significantly decreased. As a result, relatively light weight components can be implemented in examples disclosed herein.

Figure 10:
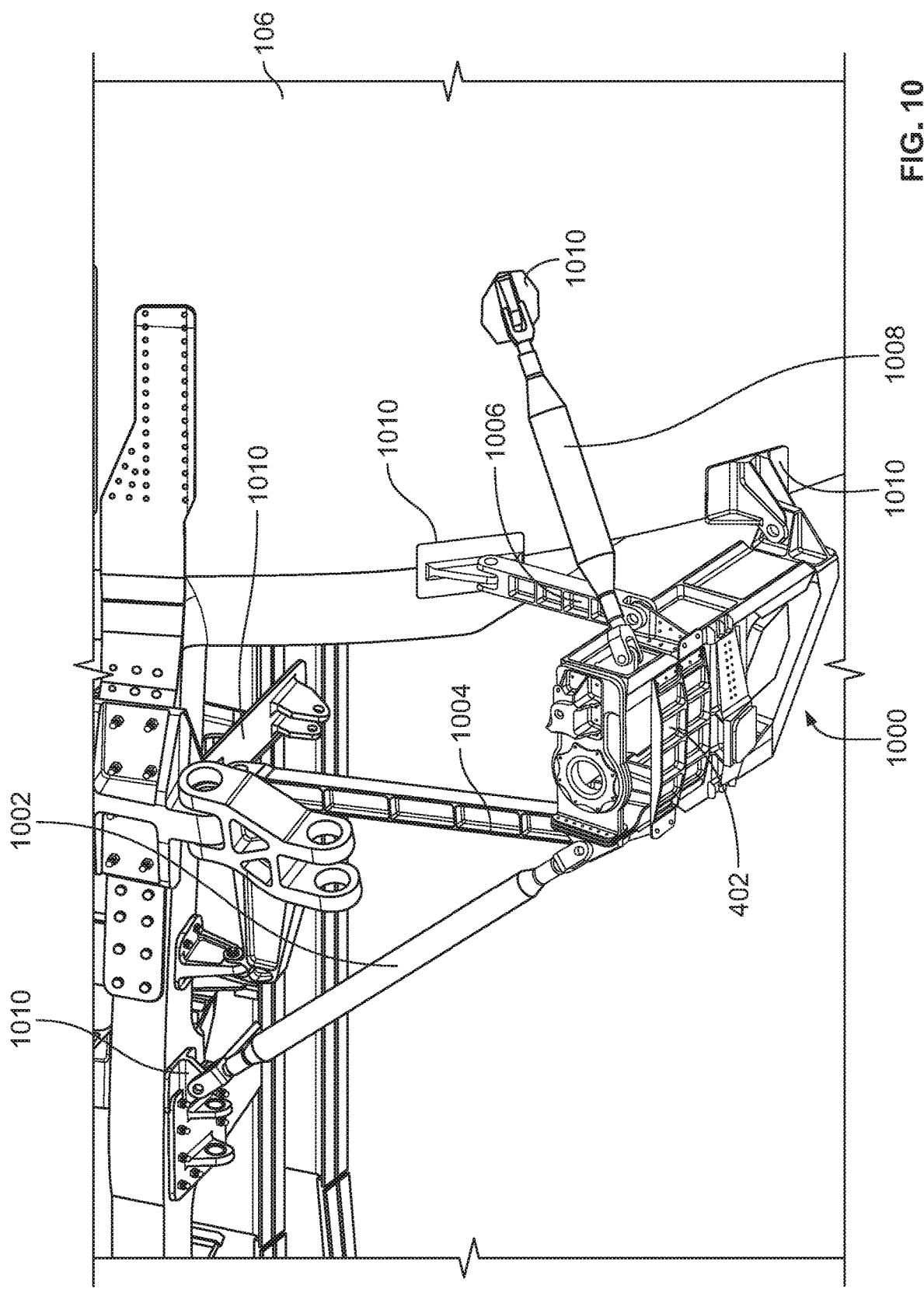
FIG. 10 depicts installation of a frame mount that can be implemented in examples disclosed herein.

FIG. 10 depicts a frame mount 1000 that can be implemented in examples disclosed herein. In the illustrated view of FIG. 10, the fuselage surface 106 is depicted. In the illustrated example, the frame mount 1000 is implemented to position and support the support 402. The frame mount 1000 includes a forward tie rod 1002, a forward support column 1004, an aft support column 1006, an aft tie rod 1008 and surface mounts 1010, all of which are implemented to position and/or stabilize the support 402.

Figure 11:
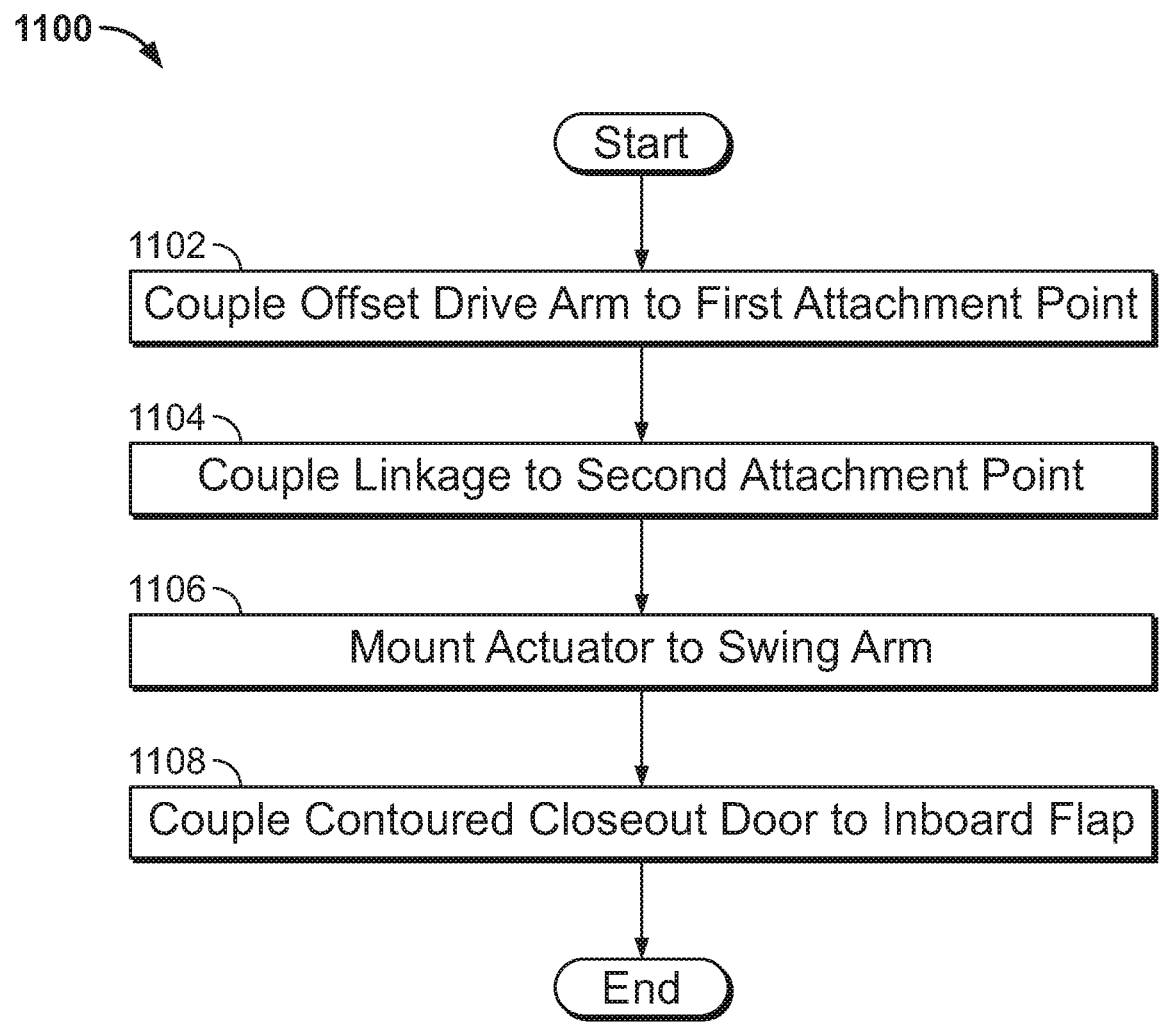
FIG. 11 is a flowchart representative of an example method to produce examples disclosed herein.

FIG. 11 is a flowchart representative of an example method 1100 to produce examples disclosed herein. In the illustrated example, the inboard flap support 400 is being assembled to the aircraft 100.

At block 1102, the offset drive arm 420 of the illustrated example is coupled to the first attachment point 702 of the inboard flap 128. In this example, the offset drive arm 420 is rotatably coupled to the first attachment point 702.

At block 1104, the linkage 432 is coupled to the second attachment point 703, which is positioned at a different location from the first attachment point 702. In this example, the linkage 432 is rotatably coupled to the second attachment point 703.

At block 1106, the actuator 414 is mounted and/or coupled to the swing arm 410. In this example, the actuator 414 is implemented as a ball screw actuator.

At block 1108, the closeout door 430, which is contoured in this example, is coupled to the inboard flap 128. The closeout door 430 may be coupled to the inboard flap 128 prior to integrating the inboard flap 128 to the aircraft 100.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Example 1 includes an apparatus having an inboard flap support for moving an inboard flap. The inboard flap support includes an offset drive arm extending between a first attachment point of the inboard flap and a first pivot of a support, and a linkage extending between a second attachment point of the inboard flap positioned at a different position from the first attachment point and a second pivot of the support.

Example 2 includes the inboard flap support as defined in example 1, further including a drive rib to support the first and second attachment points.

Example 3 includes the inboard flap support as defined in example 1, further including a ball screw actuator to rotate the offset drive arm at the first pivot.

Example 4 includes the inboard flap support as defined in example 1, further including a pivot mount bracket to at least partially define the second attachment point.

Example 5 includes the inboard flap support as defined in example 4, where the pivot mount bracket includes a flanged end to be coupled to a drive rib of the inboard flap.

Example 6 includes the inboard flap support as defined in example 1, where the offset drive arm includes a frame structure with a generally rectangular cross-sectional profile.

Example 7 includes the inboard flap support as defined in example 1, further including a contoured closeout door exhibiting a curvature that is complementary to a wing-to-body fairing attached to a fuselage.

Example 8 includes the inboard flap support as defined in example 1, where the inboard flap is not driven or supported by a torque tube.

Example 9 includes an inboard flap for use with an aircraft. The inboard flap includes a support rib extending between fore and aft sides of the inboard flap, a first attachment point to be operatively coupled to an offset drive arm at a first position of the inboard flap, where the offset drive arm is to be operationally coupled to a first pivot of a support, and a second attachment point to be operatively coupled to a linkage at a second position of the inboard flap, where the second position is different from the first position, and where the linkage is to be operationally coupled to a second pivot of the support.

Example 10 includes the inboard flap as defined in example 9, further including a pivot mount bracket to support the second attachment point.

Example 11 includes the inboard flap as defined in example 10, where the pivot mount bracket includes a flanged end to be coupled to a drive rib of the inboard flap.

Example 12 includes the inboard flap as defined in example 9, further including a drive rib to support the first and second attachment points.

Example 13 includes the inboard flap as defined in example 12, where the drive rib is coupled to the support rib.

Example 14 includes the inboard flap as defined in example 12, where the drive rib exhibits a canted orientation.

Example 15 includes the inboard flap as defined in example 14, where the drive rib exhibits the canted orientation in a range from approximately 8 to 16 degrees.

Example 16 includes the inboard flap as defined in example 12, where the first attachment point includes a first portion of the support rib and a second portion of the drive rib.

Example 17 includes the inboard flap as defined in example 16, where the first and second portions are rigidly coupled together.

Example 18 includes a method including coupling an offset drive arm to a first attachment point of an inboard flap, where the offset drive arm is to extend between the first attachment point and a first pivot of a support, and coupling a linkage to a second attachment point of the inboard flap, where the linkage is to extend between the second attachment point and a second pivot of the support, and where the second attachment point is located at a different position from the first attachment point.

Example 19 includes the method as defined in example 18, further including mounting an actuator to a swing arm, wherein the swing arm causes movement of the offset drive arm.

Example 20 includes the method as defined in example 18, further including coupling a contoured closeout door to the inboard flap.

From the foregoing, it will be appreciated that example methods, apparatus and articles of manufacture have been disclosed that enable an increased movement range of inboard flaps. Further, examples disclosed herein enable relatively light and cost-effective parts to be implemented for supporting inboard flaps. Examples disclosed herein can also improve overall aircraft aerodynamic characteristics by implementing a canted orientation of inboard flap surfaces. Further, by eliminating a need for components typically used to support and move inboard flaps, examples disclosed herein enable greater ease of service and reduced system complexity which, in turn, can yield greater reliability.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown related to operation of inboard flaps, examples disclosed herein can be applied to any appropriate actuation system and/or aerodynamic application.

The following claims are hereby incorporated into this Detailed Description by this reference, with each claim standing on its own as a separate embodiment of the present disclosure.

What is claimed is:

1. An inboard flap support for supporting and moving an inboard flap, the inboard flap support comprising:
   an offset drive arm extending between a first attachment point of the inboard flap and a first pivot of a support, the offset drive arm to be rotationally driven about the first pivot and extending between the first attachment point and the first pivot along:
      (i) a longitudinal direction of the inboard flap, and
      (ii) a vertical direction of the inboard flap; and
   a linkage extending between a second attachment point of the inboard flap positioned at a different position from the first attachment point and a second pivot of the support, the rotation of the offset drive arm to cause the inboard flap and the linkage to rotate, the linkage to rotate about the second pivot.

2. The inboard flap support as defined in claim 1, further including a drive rib to support the first and second attachment points.

3. The inboard flap support as defined in claim 1, further including a ball screw actuator to rotate the offset drive arm at the first pivot.

4. The inboard flap support as defined in claim 1, further including a pivot mount bracket to at least partially define the second attachment point.

5. The inboard flap support as defined in claim 4, wherein the pivot mount bracket includes a flanged end to be coupled to a drive rib of the inboard flap.

6. The inboard flap support as defined in claim 1, wherein the offset drive arm includes a frame structure with a generally rectangular cross-sectional profile.

7. The inboard flap support as defined in claim 1, further including a contoured closeout door exhibiting a curvature that is complementary to a wing-to-body fairing on a fuselage.

8. The inboard flap support as defined in claim 1, wherein the inboard flap is not driven or supported by a torque tube.

9. An inboard flap for use with an aircraft, the inboard flap comprising:
   a support rib extending between fore and aft sides of the inboard flap;
   a first attachment point to be operatively coupled to an offset drive arm at a first position of the inboard flap, the offset drive arm to be operationally coupled to a first pivot of a support, the offset drive arm to be rotationally driven about the first pivot and extending between the first attachment point and the first pivot along:
(i) a longitudinal direction of the inboard flap, and
(ii) a vertical direction of the inboard flap; and
a second attachment point to be operatively coupled to a linkage at a second position of the inboard flap, the second position different from the first position, the linkage to be operationally coupled to a second pivot of the support, the rotation of the offset drive arm to cause the inboard flap and the linkage to rotate, the linkage to rotate about the second pivot.

10. The inboard flap as defined in claim 9, further including a pivot mount bracket to support the second attachment point.

11. The inboard flap as defined in claim 10, wherein the pivot mount bracket includes a flanged end to be coupled to a drive rib of the inboard flap.

12. The inboard flap as defined in claim 9, further including a drive rib to support the first and second attachment points.

13. The inboard flap as defined in claim 12, wherein the drive rib is coupled to the support rib.

14. The inboard flap as defined in claim 12, wherein the drive rib exhibits a canted orientation.

15. The inboard flap as defined in claim 14, wherein the drive rib exhibits the canted orientation in a range from approximately 8 to 16 degrees.

16. The inboard flap as defined in claim 12, wherein the first attachment point includes a first portion of the support rib and a second portion of the drive rib.

17. The inboard flap as defined in claim 16, wherein the first and second portions are rigidly coupled together.

18. A method comprising:
coupling an offset drive arm to a first attachment point of an inboard flap, the offset drive arm to extend between the first attachment point and a first pivot of a support, the offset drive arm to be rotationally driven about the first pivot and extending between the first attachment point and the first pivot along:
(i) a longitudinal direction of the inboard flap, and
(ii) a vertical direction of the inboard flap; and
coupling a linkage to a second attachment point of the inboard flap, the linkage to extend between the second attachment point and a second pivot of the support, the second attachment point located at a different position from the first attachment point, the rotation of the offset drive arm to cause the inboard flap and the linkage to rotate, the linkage to rotate about the second pivot.

19. The method as defined in claim 18, further including mounting an actuator to a swing arm, wherein the swing arm causes movement of the offset drive arm.

20. The method as defined in claim 18, further including coupling a contoured closeout door to the inboard flap.

* * * * *